United States Patent
Hoke et al.

(10) Patent No.: US 9,724,980 B2
(45) Date of Patent: Aug. 8, 2017

(54) WINDSHIELD DEFOGGING SYSTEM AND METHOD

(71) Applicant: FORD GLOBAL TECHNOLOGIES, LLC, Dearborn, MI (US)

(72) Inventors: Paul Bryan Hoke, Plymouth, MI (US); Alan Douglas Wallington, Detroit, MI (US); Alan Gutowski, Dearborn Heights, MI (US); Amy Golden, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 14/464,309

(22) Filed: Aug. 20, 2014

(65) Prior Publication Data
US 2016/0052366 A1 Feb. 25, 2016

(51) Int. Cl.
*B60H 1/22* (2006.01)
*B60H 1/00* (2006.01)
*H05B 3/84* (2006.01)
*H05B 1/02* (2006.01)

(52) U.S. Cl.
CPC ....... *B60H 1/2218* (2013.01); *B60H 1/00785* (2013.01); *B60H 1/00828* (2013.01); *H05B 1/0236* (2013.01); *H05B 3/84* (2013.01); *B60H 2001/224* (2013.01); *B60H 2001/2262* (2013.01)

(58) Field of Classification Search
CPC .............. B60H 1/2218; B60H 1/00785; B60H 1/00828; B60H 2001/224; B60H 2001/2262; H05B 3/84
USPC ...... 219/202, 203, 219, 489; 701/1, 31.4, 36
See application file for complete search history.

(56) References Cited

U.S. PATENT DOCUMENTS

| 3,982,092 | A | 9/1976 | Marriott |
| 6,112,807 | A | 9/2000 | Dage |
| 6,155,061 | A | 12/2000 | Davis, Jr. et al. |
| 6,347,746 | B1 | 2/2002 | Dage et al. |
| 6,508,408 | B2 | 1/2003 | Kelly et al. |
| 8,285,443 | B2 | 10/2012 | Akahoshi et al. |
| 2006/0171704 | A1* | 8/2006 | Bingle .................. B60R 11/04 396/419 |
| 2007/0055423 | A1* | 3/2007 | Yoshida .............. B60R 11/0264 701/36 |
| 2009/0112389 | A1* | 4/2009 | Yamamoto .......... B60C 23/0401 701/31.4 |

(Continued)

FOREIGN PATENT DOCUMENTS

| CN | 102205782 A | 10/2011 |
| EP | 1112871 A1 | 7/2001 |

(Continued)

OTHER PUBLICATIONS

English machine translation of CN102205782A.

*Primary Examiner* — Thien S Tran
(74) *Attorney, Agent, or Firm* — Vichit Chea; King & Schickli, PLLC (57) ABSTRACT

A windshield defogging system and method are provided. The system includes a heated windshield with an electrical heating element, an air circulation system with a blower to provide a stream of air over a surface of the windshield and a controller configured to select a duty cycle for the heating element based upon air circulation system operating parameters and environmental conditions such as ambient temperature.

19 Claims, 13 Drawing Sheets

(56) References Cited

U.S. PATENT DOCUMENTS

| | | |
|---|---|---|
| 2013/0052929 A1 | 2/2013 | Eisenhour |
| 2014/0027090 A1 | 1/2014 | Morikawa et al. |
| 2015/0183291 A1* | 7/2015 | Higuchi ............ B60H 1/00785 62/133 |

FOREIGN PATENT DOCUMENTS

| | | | |
|---|---|---|---|
| EP | 2202107 A1 | 6/2010 | |
| JP | WO 2014002377 A1 * | 1/2014 | ......... B60H 1/00785 |

* cited by examiner

TABLE A    Output is the duration of the HWS at 100% duty cycle.

| AMBIENT | TIMER |
|---|---|
| -18 | 15 |
| -1 | 15 |
| 5 | 10 |
| 15 | 8 |
| 30 | 4 |

Table values are evaluated as a step function.
Need Hysteresis for ambient temperature.
[e.x. at 4°C ambient, the timer is 15 mins. At 29°C ambient, the timer is 8 mins.)

FIG. 7

TABLE B    HWS duty cycle based on mode and blower.

| Mode / Blower Setting | 0 | 1 | 2 | 3 | 4 | 5 | 6 | 7 |
|---|---|---|---|---|---|---|---|---|
| Defrost/Floor | 0% | 75% | 75% | 75% | 75% | 75% | 75% | 75% |
| Defrost/Panel | 0% | 50% | 50% | 50% | 50% | 50% | 50% | 50% |
| Defrost/Panel/Floor | 0% | 50% | 50% | 50% | 50% | 50% | 50% | 50% |
| Floor | 0% | 50% | 50% | 50% | 50% | 50% | 50% | 50% |
| Panel | 0% | 0% | 0% | 0% | 0% | 0% | 0% | 0% |
| Panel/Floor | 0% | 0% | 0% | 0% | 0% | 0% | 0% | 0% |

Table values are continuous.
Need Hysteresis for blower speed to account for automatically controlled blower use cases.

FIG. 8

TABLE C    HWS duty cycle based on mode and blower.

| Mode / Blower Setting | 0 | 1 | 2 | 3 | 4 | 5 | 6 | 7 |
|---|---|---|---|---|---|---|---|---|
| Defrost/Floor | 0% | 50% | 50% | 50% | 50% | 50% | 50% | 50% |
| Defrost/Panel | 0% | 0% | 0% | 0% | 0% | 0% | 0% | 0% |
| Defrost/Panel/Floor | 0% | 0% | 0% | 0% | 0% | 0% | 0% | 0% |
| Floor | 0% | 0% | 0% | 0% | 0% | 0% | 0% | 0% |
| Panel | 0% | 0% | 0% | 0% | 0% | 0% | 0% | 0% |
| Panel/Floor | 0% | 0% | 0% | 0% | 0% | 0% | 0% | 0% |

Table values are continuous.
Need Hysteresis for blower speed to account for automatically controlled blower use cases.

FIG. 9

TABLE D    HWS duty cycle based on ambient and fog probability.

| Ambient (C) / Fog Prob | 0% | 20% | 40% | 60% | 100% |
|---|---|---|---|---|---|
| -20 | 0% | 25% | 50% | 50% | 50% |
| -10 | 0% | 25% | 50% | 50% | 50% |
| 0 | 0% | 25% | 50% | 50% | 50% |
| 10 | 0% | 25% | 50% | 50% | 50% |
| 20 | 0% | 25% | 50% | 50% | 50% |
| 30 | 0% | 25% | 50% | 50% | 50% |

Table values are evaluated as a step function
Need Hysteresis for Fog Prob [e.x. at -20°C ambient and 30% Fog Prob, the duty cycle is increased by 25%.)

FIG. 10

TABLE E  Output is the allowable time of max operation at a given ambient temperature.

| AMBIENT | TIME |
|---|---|
| -18 | 15 |
| -1 | 15 |
| 5 | 10 |
| 15 | 8 |
| 30 | 4 |

Table values are evaluated as a step function
Need Hysteresis for ambient temperature
[e.x. at 4°C ambient, the timer is 15 mins. At 29°C ambient, the timer is 8 mins.)

FIG. 11

TABLE F  Output is the modified max operation for the Driver Side HWS at a given ambient temperature when conditions are met.

| AMBIENT | DUTY CYCLE |
|---|---|
| -18 | 80% |
| 0 | 80% |
| 15 | 80% |
| 31 | 0% |

Table values are evaluated as a step function
Need Hysteresis for ambient temperature
[e.x. at 12°C ambient, the duty cycle is modified to 80%. At 32°C ambient, the duty cycle is reduced to 0%.)

FIG. 12

TABLE G  Output is the modified max operation for the Passenger Side HWS at a given ambient temperature when conditions are met.

| AMBIENT | DUTY CYCLE |
|---|---|
| -18 | 0% |
| 0 | 0% |
| 15 | 0% |
| 31 | 0% |

Table values are evaluated as a step function

Need Hysteresis for ambient temperature

[e.x. at 12°C ambient, the duty cycle is modified to 80%. At 32°C ambient, the duty cycle is reduced to 0%.)

FIG. 13

| Vehicle Dependent | |
|---|---|
| Fog Delta Temp | Fog Table |
| 0 | 80 |
| 3 | 60 |
| 6 | 54.5 |
| 9 | 51.2 |
| 12 | 49.2 |
| 15 | 47.2 |
| 18 | 45.2 |
| 21 | 43.7 |
| 24 | 42.2 |
| 27 | 40.7 |
| 30 | 39.2 |
| 33 | 37.7 |
| 36 | 35.8 |
| 39 | 33.8 |
| 42 | 31.7 |
| 45 | 30 |
| 48 | 29.1 |
| 51 | 28.1 |
| 54 | 27.6 |
| 57 | 27 |
| 100 | 27 |

FIG. 14

# WINDSHIELD DEFOGGING SYSTEM AND METHOD

TECHNICAL FIELD

This document relates generally to vehicle climate control systems and, more particularly, to a windshield defogging system that automatically compensates for air circulation system operating parameters and changes in environmental conditions to provide optimized windshield defogging performance.

BACKGROUND

Many vehicles today are equipped with air circulation systems including automated controls that maintain a set temperature in the passenger compartment of the vehicle. Some vehicles also include hands-free communication systems with Bluetooth connection for operation of a driver's or passenger's cell phone. Some of these systems will reduce the operating speed of the air circulation system blower in order to reduce background noise and allow for better communication over the hands-free system.

This document relates to a windshield defogging system that determines the probability of windshield fogging and then automatically compensates for changes in air circulation system operating parameters and/or changes in environmental conditions so as to provide optimal defogging performance at all times when conditions exist that would otherwise promote windshield fogging.

SUMMARY

In accordance with the purposes and benefits described herein, a windshield defogging system is provided for a vehicle. That system includes a windshield having (a) an electrical heating element, (b) an air circulation system, including a blower to provide a stream of air over a surface of that windshield, and (c) a controller configured to select a duty cycle for the electrical heating element from predetermined data based upon air circulation system operating parameters and environmental conditions such as ambient temperature. In one possible embodiment, the controller is also configured to calculate a fogging probability value and the duty cycle is selected by the controller based upon air circulation system operating parameters, that fogging probability value and ambient temperature.

Air circulation system operating parameters useful in the operation of the present system may be selected from a group consisting of operating mode, blower speed, air stream temperature, air stream humidity and combinations thereof.

In one possible embodiment the controller comprises a computing device including a main processor, a memory, a network interface and a communications bus. Further the circulation system includes an air conditioning circuit, including an evaporator, a condenser and a compressor for cooling and humidifying the air stream, and a heater core for heating the air stream.

The defogging system includes at least one sensor selected from a group consisting of an outside ambient temperature sensor, a rain sensor, a passenger compartment humidity sensor, a passenger compartment temperature sensor, a windshield wiper activation sensor, seat sensors, an air circulation system duct temperature sensor, an air circulation system duct humidity sensor, an air circulation system evaporator thermistor, a sun load sensor, a vehicle speed sensor and combinations thereof. Further in one possible embodiment the defogging system includes a fogging detection camera.

In accordance with an additional aspect, a motor vehicle is provided incorporating the windshield defogging system. In one possible embodiment, that motor vehicle further includes a body control module comprising a computing device including a main processor, a memory, a network interface, a human interface, a display device and a communications bus. In one possible embodiment, that body control module further includes a speech processor for processing voice commands related to the windshield defogging system.

In one possible embodiment, the body control module is configured to reduce an operating speed of the blower to a predetermined value when a vehicle occupant is using hands-free telephone communication within the vehicle and the controller then adjusts the duty cycle based upon the reduction in blower speed.

In one possible embodiment, the body control module includes a GPS/geolocator component to determine the current location of the vehicle at any given time. Further the body control module is configured to obtain current ambient weather condition data for the determined current location over a wireless network. In addition, a controller is configured to use the current ambient weather condition data to calculate the fogging probability value, select the duty cycle or both calculate the fogging probability value and select the duty cycle.

In accordance with yet another aspect, a method is provided for defogging a windshield of a vehicle where that vehicle is equipped with (a) a windshield including an electrical heating element, (b) an air circulation system including a blower to provide a stream of air over a surface of the windshield and (c) a controller. The method may be broadly described as including the step of selecting, by the controller, a duty cycle for the electrical heating element from predetermined data based upon air circulation system operating parameters and environmental conditions such as ambient temperature. Still further the method may include the steps of calculating, by the controller, a fogging probability value and selecting, by the controller, a duty cycle for the electrical heating element from predetermined data based upon air circulation system operating parameters, the fogging probability value and ambient temperature. Further the method may include using in the calculation of the fogging probability value at least one air circulation system operating parameter selected from a group consisting of operating mode, blower speed, air stream temperature and air stream humidity. Further the method may include the step of adjusting, by the controller, the duty cycle in response to a change in blower speed and/or a change in the volume of the air stream being directed over the surface of the windshield. Still further the method may include (a) determining, by the controller, a current location for the vehicle and current weather data for that current location and (b) using the current weather data to calculate the fogging probability value, select a duty cycle or both calculate the fogging probability value and select a duty cycle.

In the following description, there is shown and described several preferred embodiments of the windshield defogging system and related method. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the windshield defogging system and method and together with the description serve to explain certain principles thereof. In the drawings.

Reference will now be made in detail to the present preferred embodiment of the windshield defogging system, examples of which are illustrated in the accompanying drawings.

DETAILED DESCRIPTION

Figure 1:
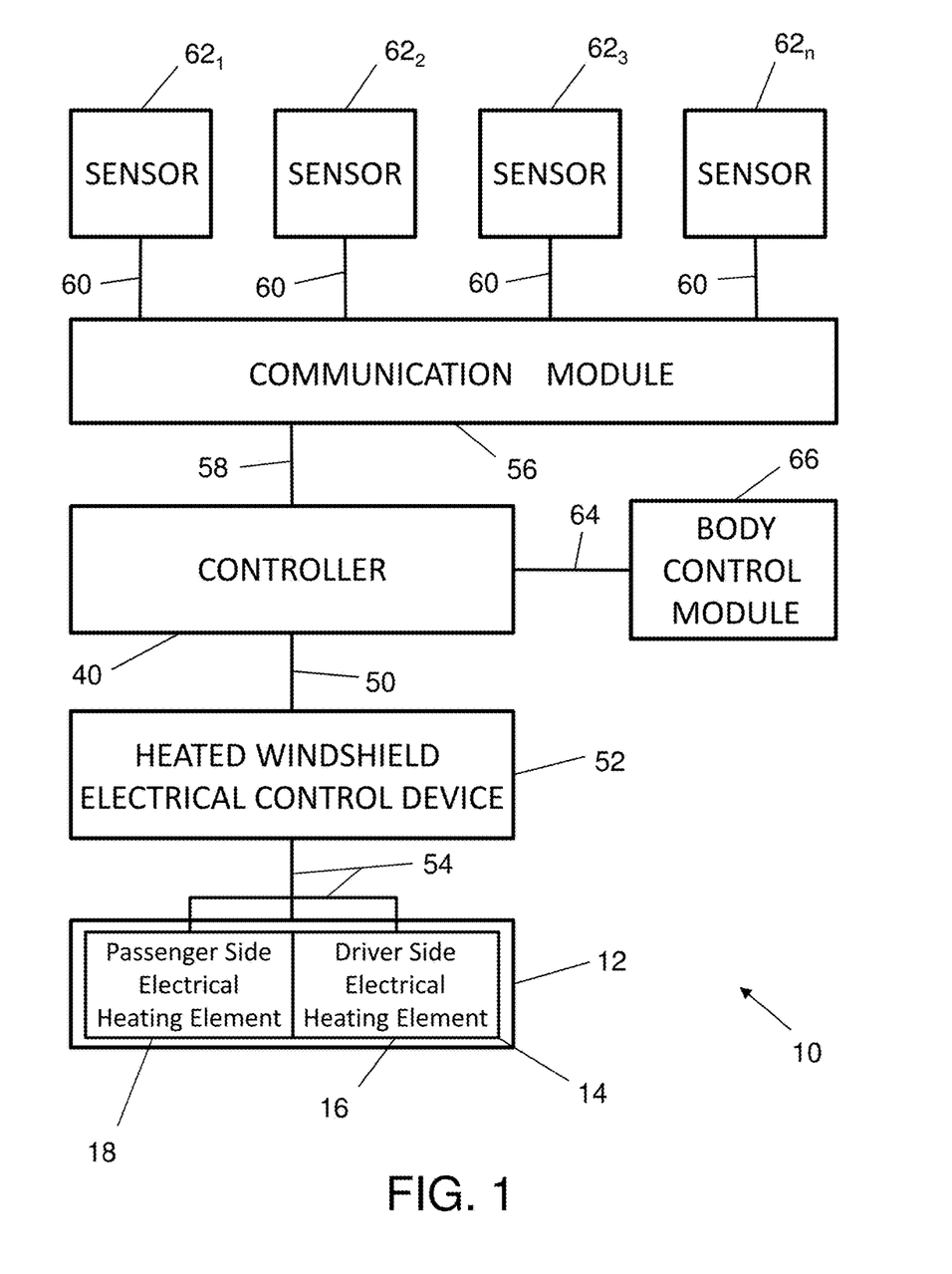
FIG. 1 is a schematic block diagram of the windshield defogging system.

Reference is now made to FIG. 1 schematically illustrating the windshield defogging system 10. The system 10 includes a windshield 12 having an electrical heating element 14. That heating element 14 may comprise a single operating unit or may include a driver side unit 16 and a passenger side unit 18 as illustrated in FIG. 1. The heated windshield 12 may be made, for example, in accordance with the teachings of U.S. Pat. No. 3,982,092, the full disclosure of which is incorporated herein by reference.

Figure 2:
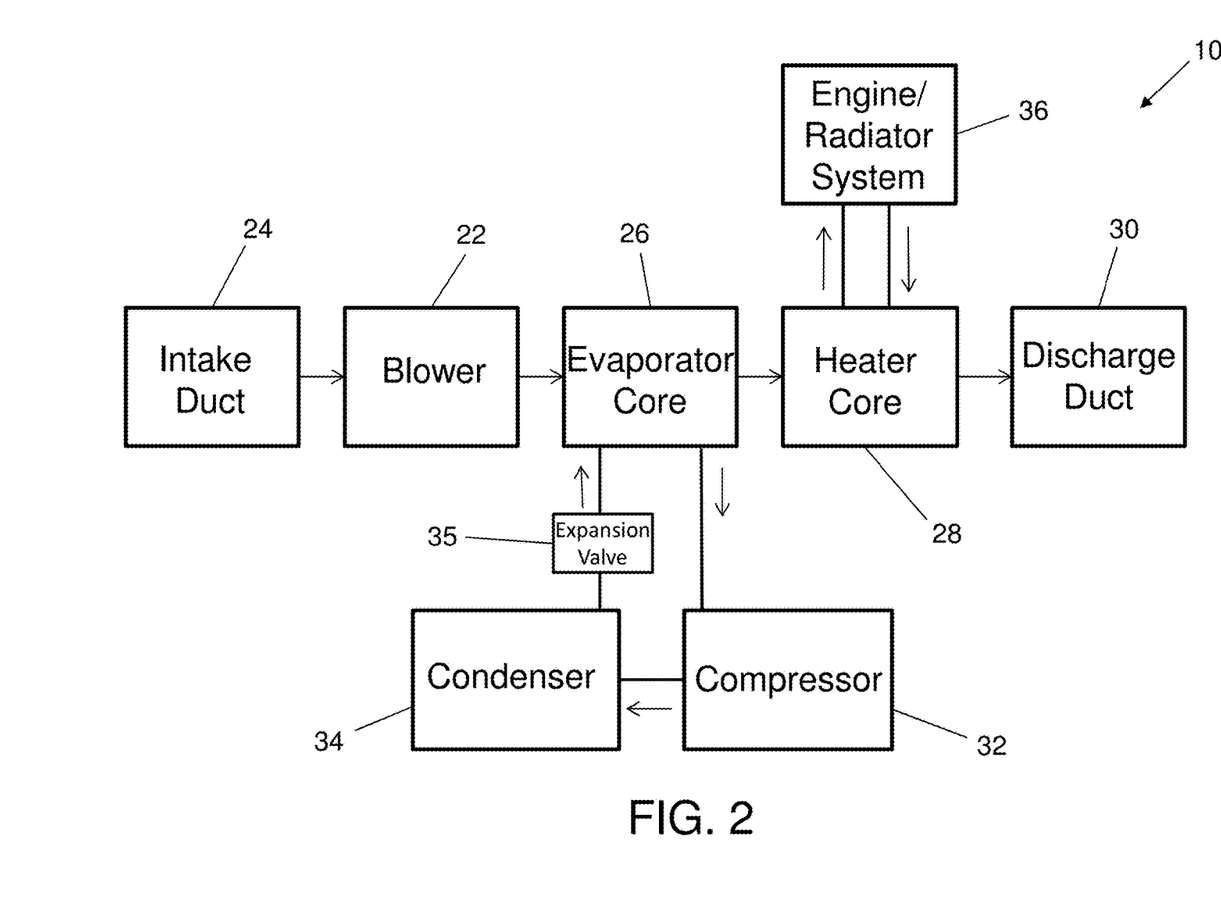
FIG. 2 is a schematic block diagram of the controller for that system.

As illustrated in FIG. 2, the windshield defogging system 10 also includes an air circulation system 20. The air circulation system 20 may be of a type generally known in the art. As illustrated, the air circulation system 20 includes a blower 22 that draws air from the passenger compartment of the vehicle through an intake duct 24 and then forces the air serially through an evaporator core 26, a heater core 28 and a discharge duct 30 through which the treated air is returned to the passenger compartment. While not illustrated, the system 20 could also include a positive temperature coefficient device or other joule heat source between the heater core 28 and discharge duct 30 if desired. As the air passes through the evaporator core 26, it is cooled and dehumidified through heat exchange with a refrigerant fluid that is circulated between a compressor 32, a condenser 34, an expansion valve 35 and the evaporator core 26. In the winter, the dried air is then heated in the heater core 20 through heat exchange with the coolant liquid circulating through the engine/radiator system 36. As should be appreciated, none, some or all of the air being circulated by the blower 22 to the discharge duct 30 may be directed in a stream over an inside surface of the windshield 12 in order to defog the windshield.

Figure 3:
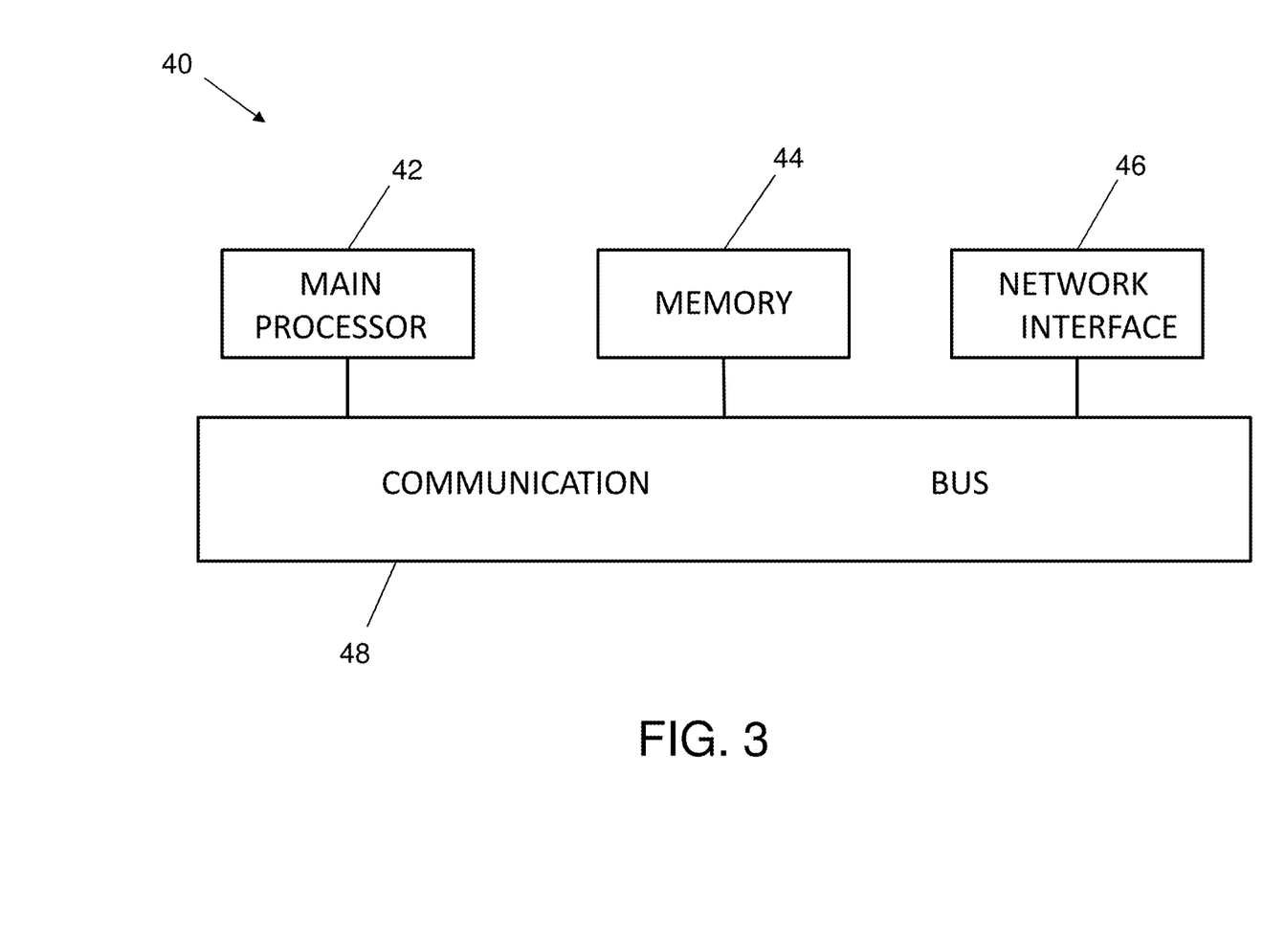
FIG. 3 is a schematic block diagram of the air circulation system of the windshield defogging system.

As further illustrated in FIG. 1, the windshield defogging system also includes a controller 40. As illustrated in FIG. 3, in one possible embodiment of the windshield defogging system 10, the controller 40 comprises one or more processors 42, one or more memories 44 and one or more network interfaces 46. As should be appreciated, all of these components 42, 44, 46 communicate with each other over a communication bus 48. Referencing back to FIG. 1, the controller 40 is connected through the control line 50 to a heated windshield electrical control device 52 which controls the operation of the window electrical heating element 14 (including the units 16, 18) through the control lines 54. In addition, the controller 40 is connected to a communication module 56 through the bus 58. In turn, the communication module 56 is connected via lines 60 to various sensors $62_1$-$62_n$. Sensors utilized in the defogging system 10 may include one or more of an outside ambient temperature sensor, a rain sensor, a passenger compartment humidity sensor, a passenger compartment temperature sensor, a windshield wiper activation sensor, seat sensors to determine the number of occupants in the vehicle, an air circulation system duct temperature sensor, an air circulation system duct humidity sensor, an air circulation system evaporator thermistor, a sun load sensor, a vehicle speed sensor and combinations thereof. For purposes of this document the term sensor may also include a fogging detection camera which is used to detect the presence of any fogging on the windshield 12. In one particularly useful embodiment of the defogging system 10, the sensors $62_1$-$62_n$ include passenger compartment humidity, outside temperature air circulation system discharge temperature, HVAC/air circulation system operating point (blower speed and mode) and passenger compartment temperature.

Figure 4:
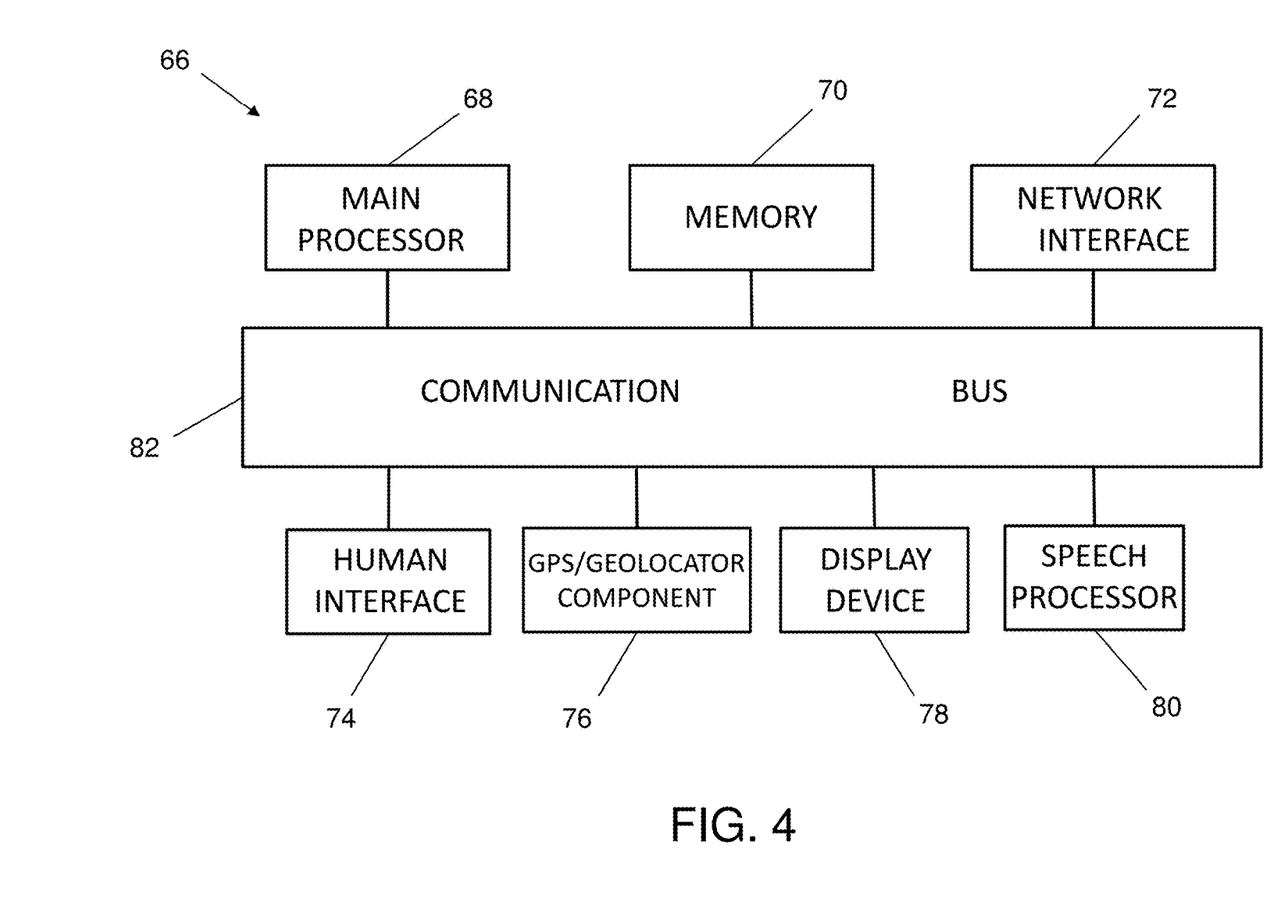
FIG. 4 is a schematic block diagram of the body control module.

In yet another possible embodiment the controller 40 is connected via the communication bus 64 to a body control module 66. As illustrated in FIG. 4, the body control module or BCM 66 may comprise a computing device having one or more processors 68, one or more memories 70, one or more network interfaces 72, a human interface 74, a GPS/geolocator component 76, a display device such as a multifunction display with touchscreen capability 78 and a speech processor 80 that all communicate with each other over a communication bus 82. The BCM 66 performs a number of interior body electrically based functions including, for example, interior locking, remote key entry, interior light, exterior light, windshield wiper control and the like. In some embodiments the BCM 66 may also function to control entertainment functions (e.g. radio, CD player and communications such as telephone and Internet communications over a wireless network). In some embodiments the BCM 66 is connected by a communication bus (not shown) to other control modules that provide one or more of these additional functions.

As should be appreciated, the windshield defogging system 10 functions to optimize the performance of the climate control system of the vehicle and minimize any possibility of the occurrence of windshield fogging. More specifically, the controller 40 is configured to select a duty cycle for the electrical heating element 14 based upon air circulation system operating parameters and environmental conditions such as ambient temperature. In another possible embodiment, the controller 40 is configured to also calculate a fogging probability value and the duty cycle is then selected by the controller based upon the air circulation system operating parameters, the fogging probability value and ambient temperature.

Air circulation system operating parameters include, but are not necessarily limited to operating mode, blower speed, air stream temperature, air stream humidity and combinations thereof. For purposes of this document, "operating mode" means the setting on the air circulation system that controls the distribution of the air stream as it exits the air circulation system and is delivered into the passenger compartment of the vehicle. For example, the air stream may be directed through (a) defroster outlets onto the inner surface of the windshield, (b) dashboard outlets on the face of the dashboard and/or (c) floor outlets onto the floor of the vehicle.

Figure 5A:
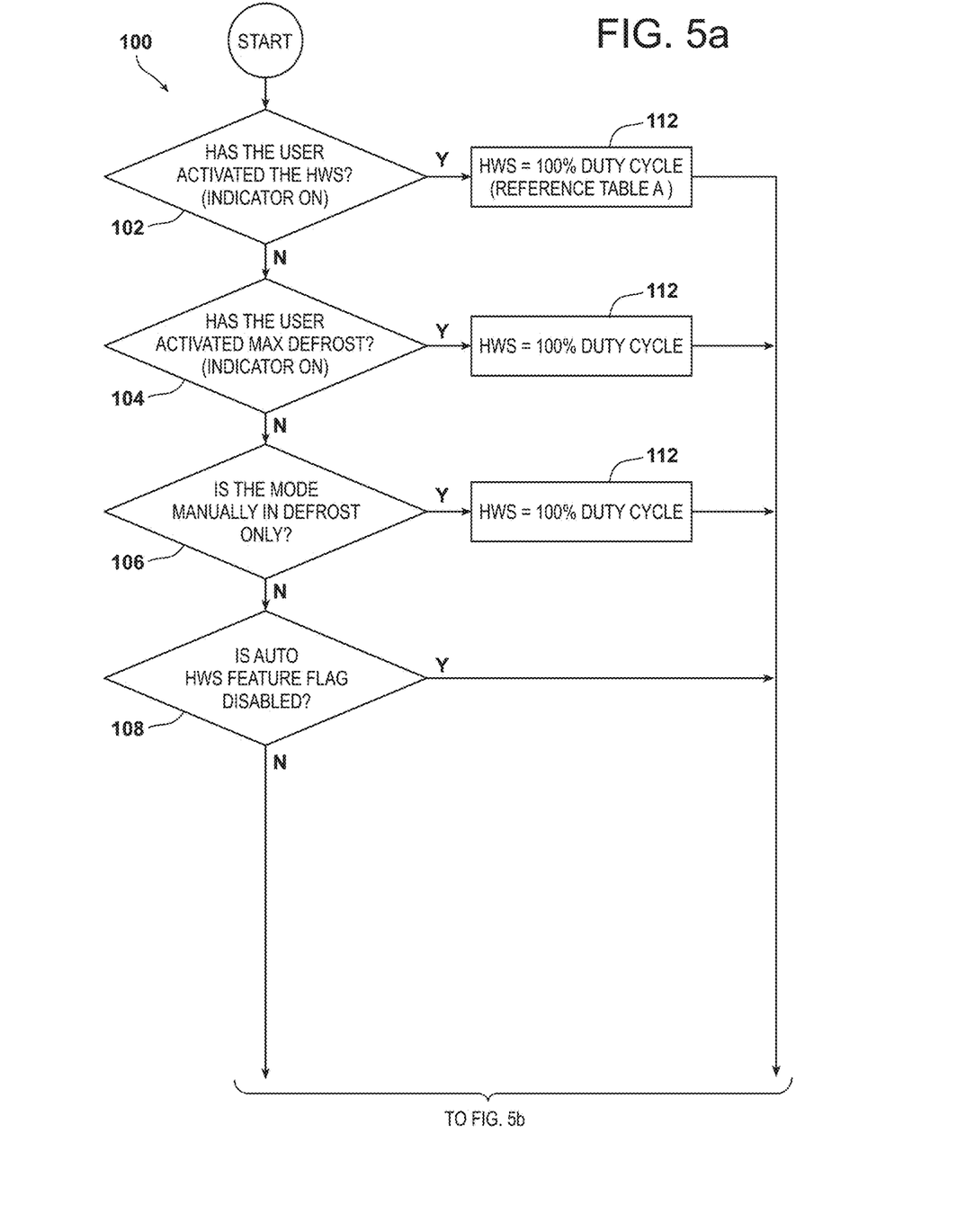
FIGS. 5a-5c are flowcharts depicting the operation methodology of the windshield defogging system.
Figure 5B:
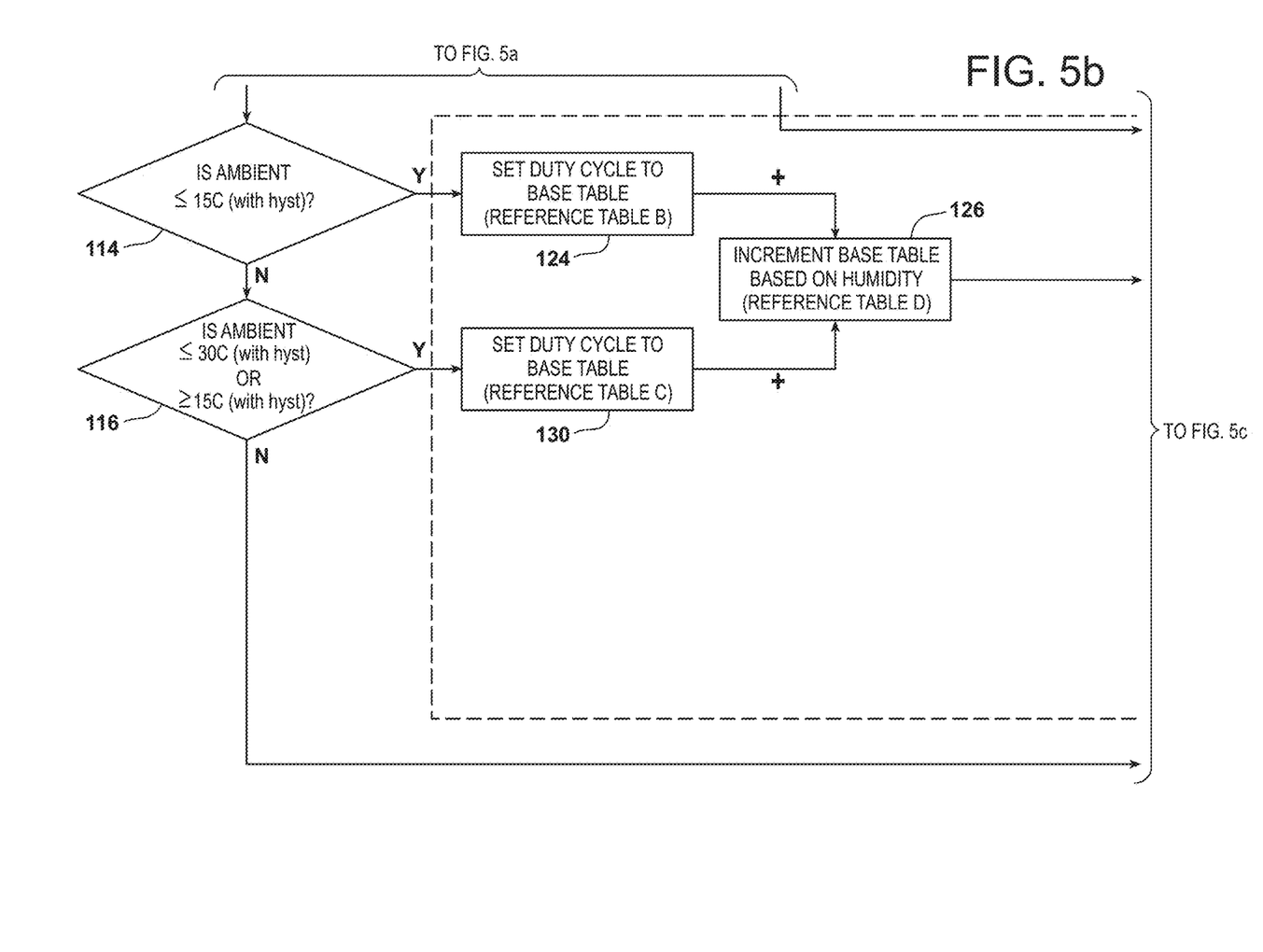
Figure 5C:
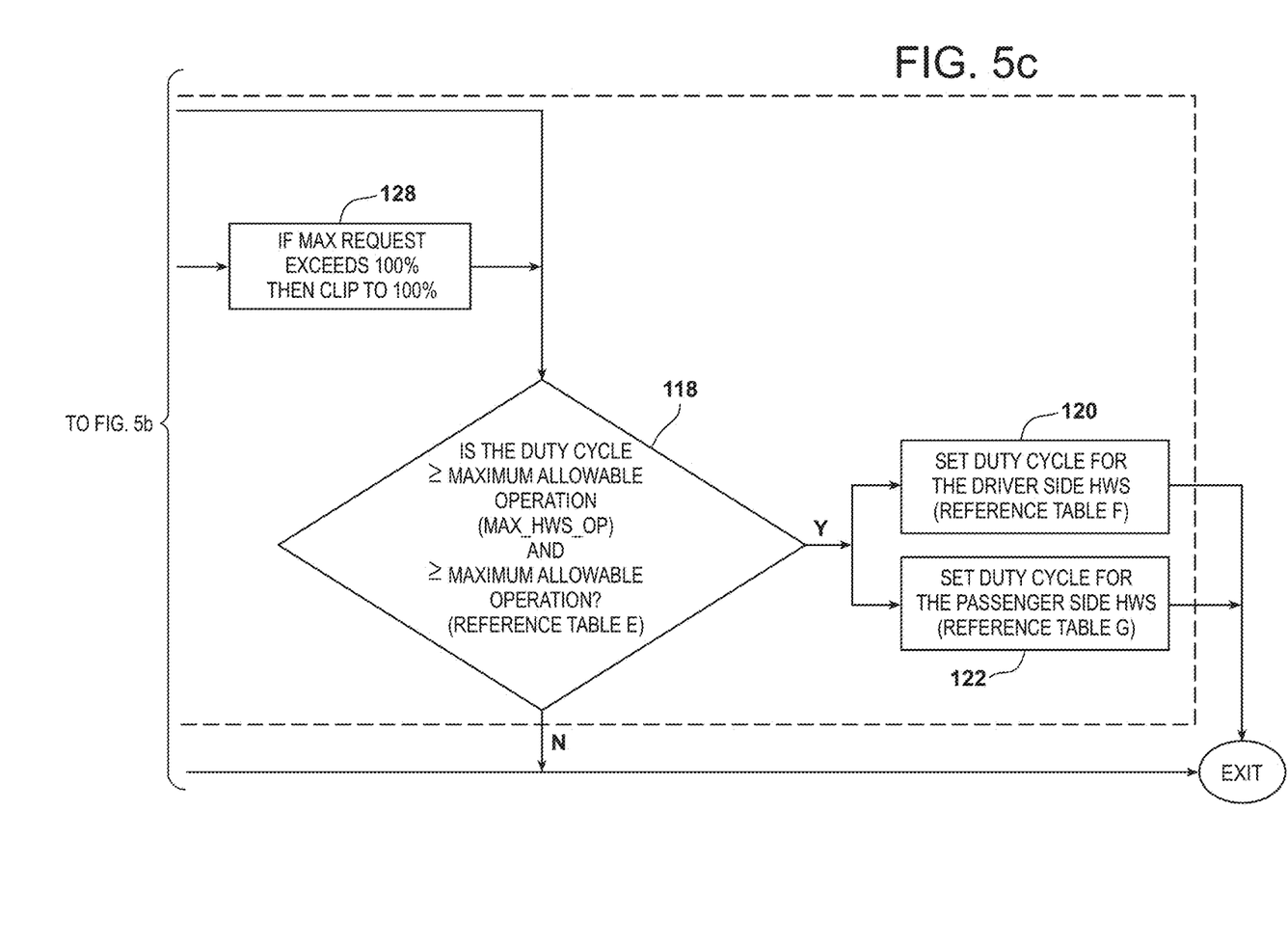

Reference is now made to FIGS. 5a-5c which, considered together, form a flow chart depicting the operation methodology 100 of one possible embodiment of the windshield defogging system 10. For purposes of this description, the calibration parameters set forth in Table 1 apply (HWS=heated windshield).

TABLE 1

CALIBRATION PARAMETERS

| Title | Value | Units | Resolution | Range | Calibrate Table | Description |
|---|---|---|---|---|---|---|
| MAX_ HWS_ OP | 100 | % | 5 | 0-100 | Y | This calibration establishes the threshold for what is deemed maximum allowable operation. |
| HWS_ WIPER_ ON | 30 | sec | 1 | 0-600 | Y | This calibration establishes the minimum waiting time in order to activate the HWS when the wipers are ON. |

Upon initiation, the controller 40 proceeds through a number of queries including:

(1) Has the user activated the electrical heating element 14 of the heated windshield 12? (see box 102);

(2) Has the user activated maximum defrost? (See box 104);

(3) Is the operating mode of the air circulation system on manual defrost only? (See box 106); and (4) Is the electrical heating element 14 of the heated windshield 12 manually disabled? (See box 108).

Figure 7:
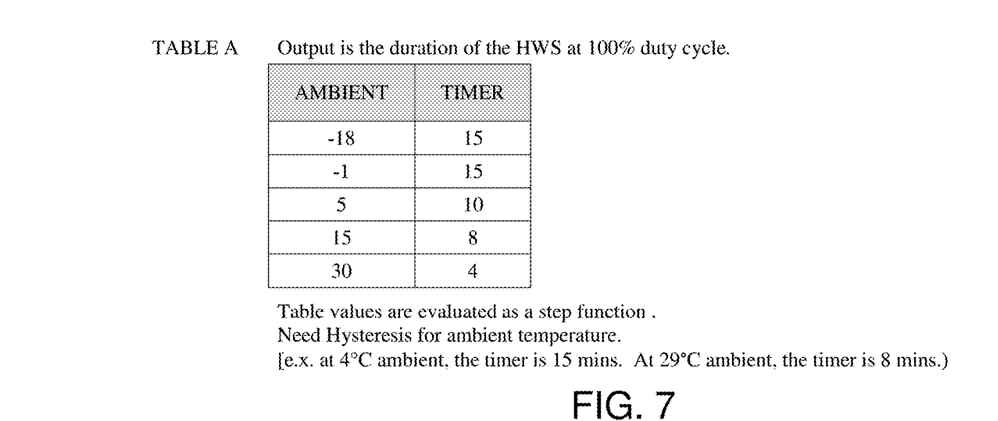
FIG. 7 is a simplified, exemplary Reference Table for the output of the electrical heating element of the windshield expressed as a duration of time at 100% duty cycle.
Figure 8:
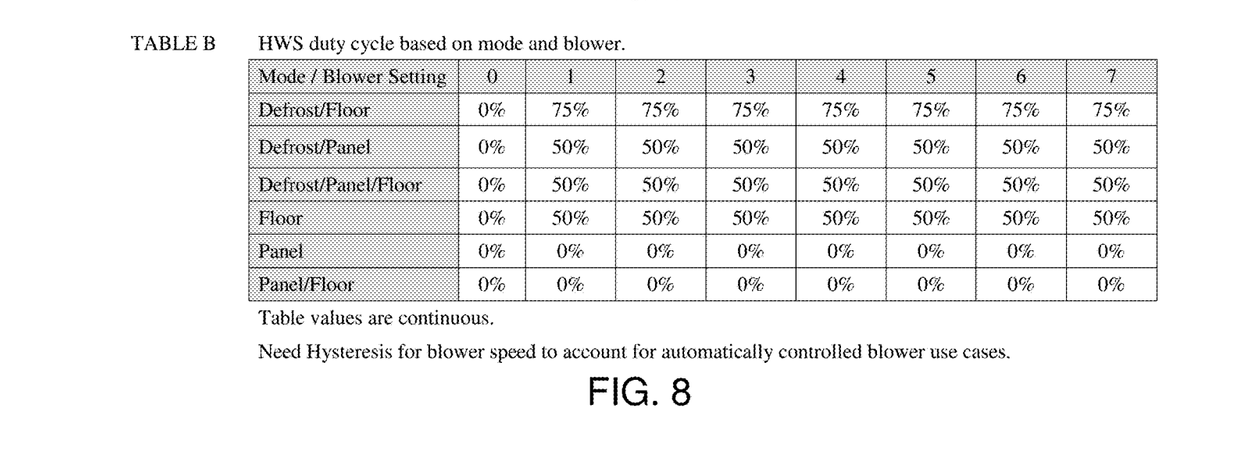
FIG. 8 is a simplified, exemplary Reference Table for the windshield electrical heating element duty cycle based on the mode and blower settings of the air circulation system at less than or equal to 15° C.
Figure 9:
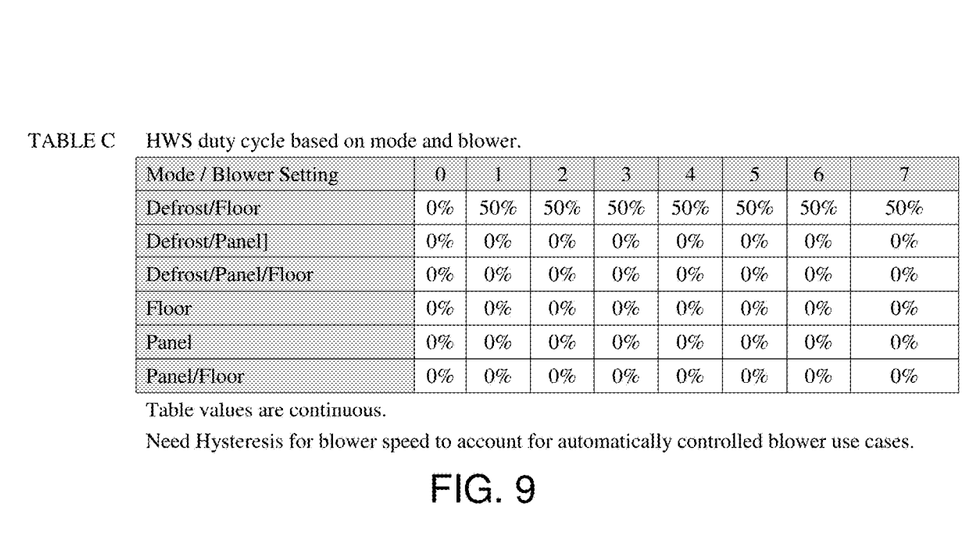
FIG. 9 is a simplified, exemplary Reference Table similar to FIG. 8 but for the windshield electrical heating element duty cycle being based upon the mode and blower settings of the air circulation system at less than or equal to 30° C. and greater than or equal to 15° C.
Figure 10:
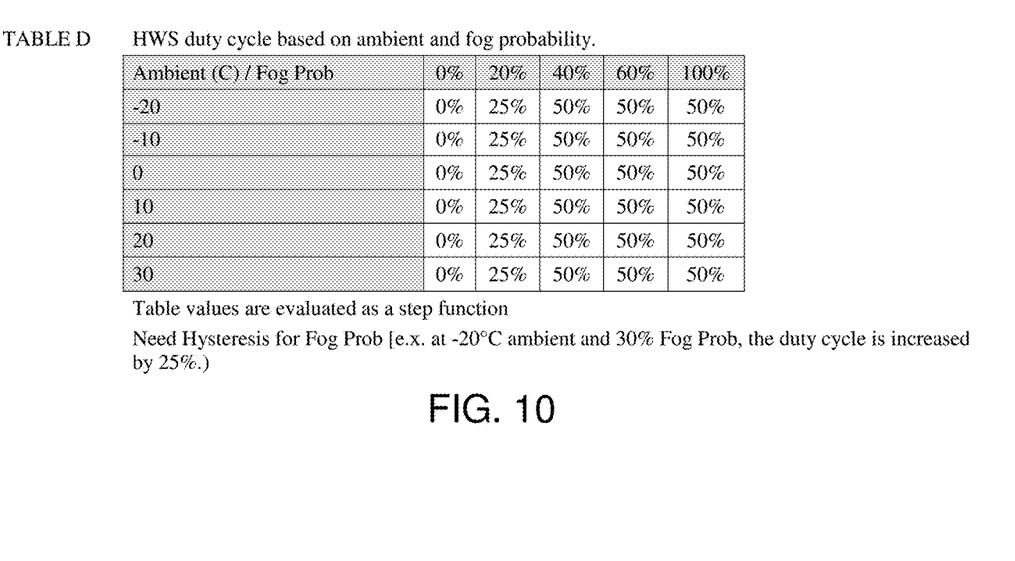
FIG. 10 is a simplified, exemplary Reference Table for the windshield electrical heating element duty cycle based on ambient temperature and fogging probability.

If the answer to any of the queries 102, 104 and 106 is "yes", then the electrical heating element 14 of the heated windshield 12 is operated at 100% duty cycle (see boxes 112) as reflected in Reference Table A (see FIG. 7 where "AMBIENT" refers to ambient temperature in degrees Celsius and "TIMER" refers to minutes). Further, if the answer to any of the queries 102, 104, 106 and 108 is "yes" then the temperature queries 114, 116 and duty cycle calculations based upon Reference Tables B, C and D (see FIGS. 8, 9 and 10) are bypassed.

Figure 11:
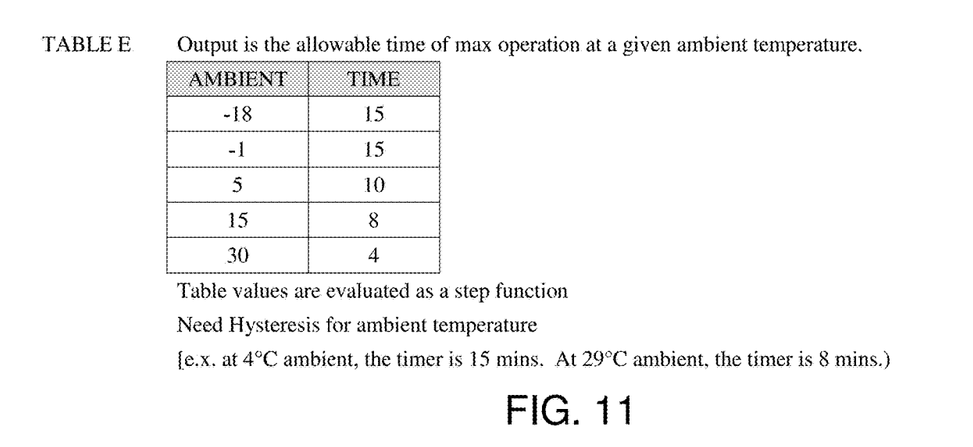
FIG. 11 is a simplified, exemplary Reference Table for the output in terms of maximum operating time at a given temperature.
Figure 12:
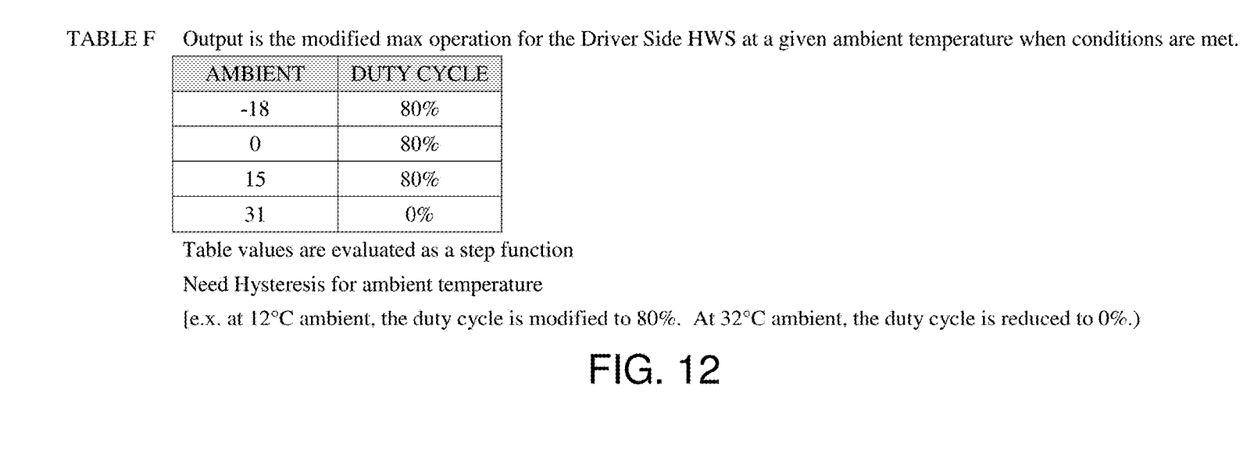
FIG. 12 is a simplified, exemplary Reference Table relating to output expressed as a modified maximum operation of the driver side of the windshield electrical heating element at a given ambient temperature when conditions of block 118 in FIG. 5c are met.
Figure 13:
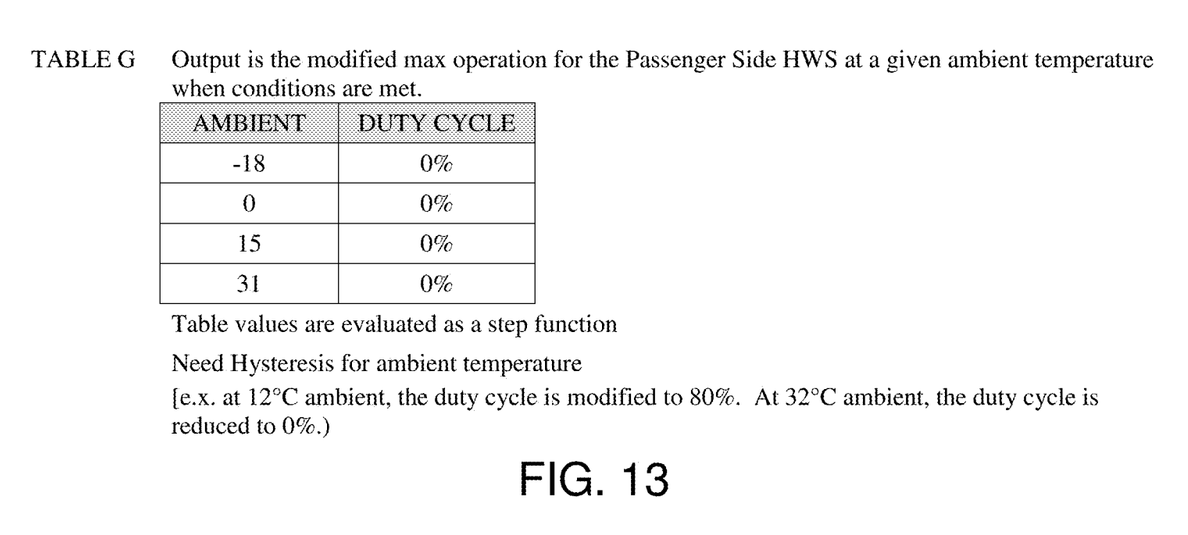
FIG. 13 is a simplified, exemplary Reference Table relating to output expressed as a modified maximum operation of the passenger side of the windshield electrical heating element at a given ambient temperature when conditions of block 118 in FIG. 5c are met.

Instead, the controller would query (see box 118) whether the duty cycle is greater than or equal to the maximum allowable operation of the electrical heating element 12 of the heated windshield 14 and whether the duty cycle is greater than or equal to the maximum allowable operation of the electrical heating element based upon Reference Table E (see FIG. 11). If the answer to that query is "yes" then the controller 40 functions to set (see box 120) the duty cycle for the driver's side heating unit 16 as per Reference Table F (see FIG. 12) and set (see box 122) the passenger's side heating unit 18 as per Reference Table G (see FIG. 13). In contrast, if the answer to the query in box 118 is "no" then no further adjustments are made.

Returning now to the situation where the answers to queries 102, 104, 106 and 108 are all "no", the controller queries whether the ambient temperature is less than or equal to 15° C. with hysteresis. If the answer is "yes" the controller sets (see box 124) the duty cycle for the heating element 14 based upon Reference Table B (see FIG. 8). The Reference table B is based upon the operating mode and the speed of the blower of the air circulation system 20. In addition, the controller adds (see box 126) an adjustment based upon Reference Table D (see FIG. 10) which takes into account ambient temperature and the fog probability value (the calculation of which will be described below).

In the event the resulting duty cycle request exceeds 100%, it is clipped to 100% at box 128 before being subjected to query 118 and potential further adjustments at boxes 120 and 122 as described above.

Returning now to box 114, if the answer is "no", the control 40 queries whether the ambient temperature is less than or equal to 30° C. with hysteresis or greater than or equal to 15° C. with hysteresis. If the answer is "no", no further adjustments are made. If the answer is "yes", the duty cycle is set by the controller 40 based upon Reference Table C (see FIG. 9) based upon the operating mode and speed of the blower plus an increment based on humidity from Reference Table D (see FIG. 10) as set forth in boxes 130 and 126. As previously noted, Reference Table D takes into account ambient temperature and the fog probability value.

The method then continues through boxes 128 and 118 and perhaps boxes 120, 122 until a final duty cycle is determined.

Figure 6:
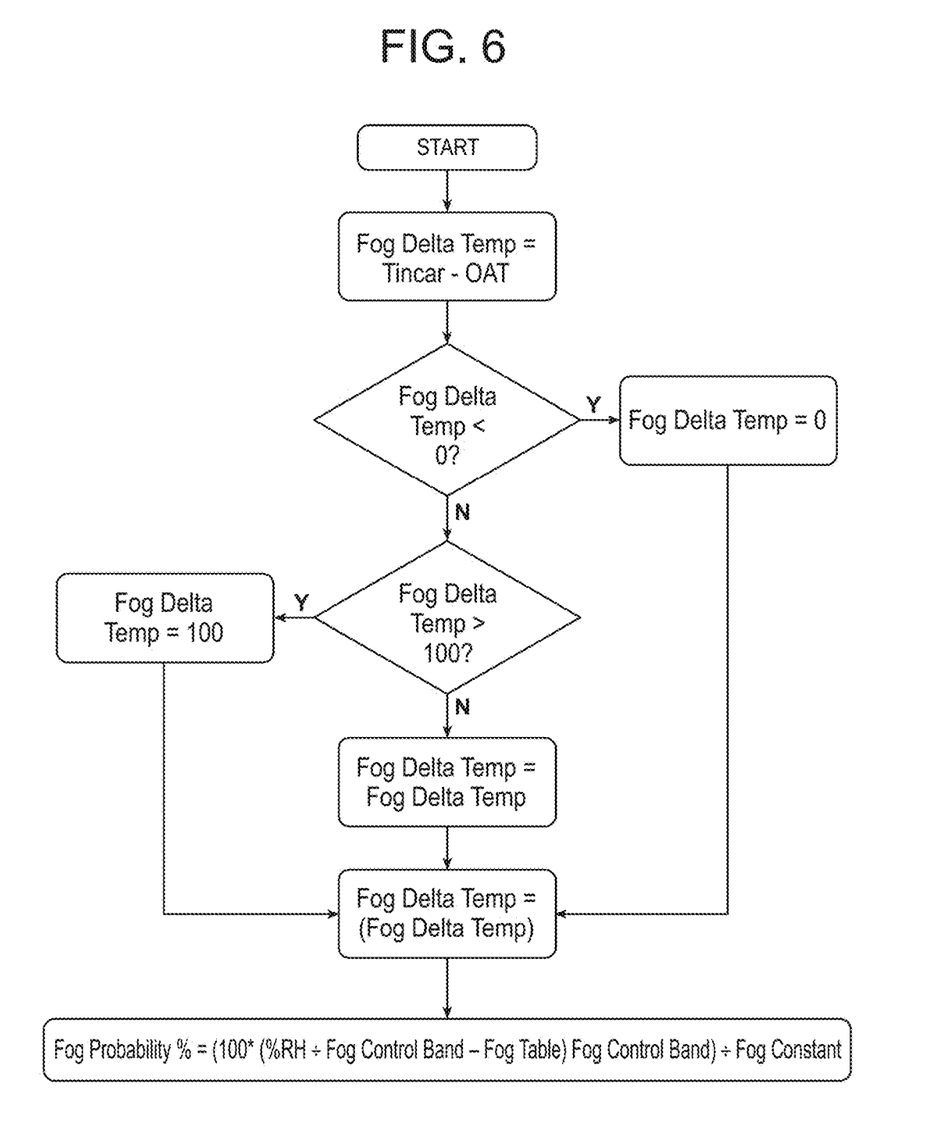
FIG. 6 is a flowchart depicting the calculation of fogging probability by the controller of the windshield defogging system.

The fogging probability value is determined by the controller 40 by means of a system algorithm such as described in the flow chart presented in FIG. 6. It should be appreciated that the particular algorithm presented is merely one example of a number of possible algorithms that could be used. For example, while not illustrated, the fogging probability value could also take into consideration other factors such as whether or not the windshield wipers are activated and/or whether or not any vehicle rain sensor is detecting rain or other precipitation.

Figure 14:
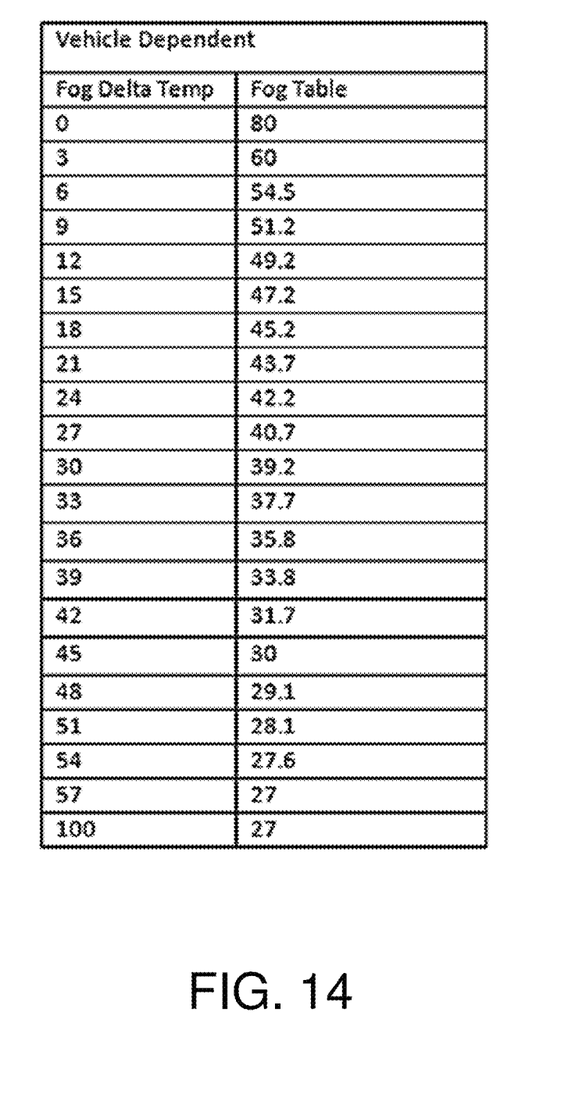
FIG. 14 is a simplified, exemplary Fog Table used in calculating the fogging probability value.

For purposes of this document and interpretation of FIG. 6, the following definitions apply.
   a) Fog Delta Temp=The absolute value difference between the outside ambient temperature and the interior passenger compartment temperature.
   b) Tincar=The interior passenger compartment temperature.
   c) Fog Constant=Offset constant to manipulate equation.
   d) Fog Control Band=Offset constant to manipulate equation.
   e) % RH=Percent relative humidity of ambient air.
   f) Fog Table=See FIG. 14 for exemplary Table.

In summary, numerous benefits are provided by the defogging system 10 and the related method of defogging a windshield of a vehicle. The system and method effectively supplements the operation of the air circulation system 20 with a heated windshield 12 equipped with an electrical heating element 14 that is automatically controlled by a controller 40 to provide optimal defogging performance at all times when fogging potential exists. More specifically, the controller selects a duty cycle for the electrical heating element 14 from predetermined data (as illustrated in the Reference Tables of FIG. 7-13 also known as lookup tables) based upon various air circulation system operating parameters, a fogging probability value calculated by the controller and environmental conditions such as ambient temperature. Various sensors $62_1$-$62_n$ may be provided to gather data points for effective operation.

Advantageously, the controller 40 adjusts the duty cycle of the electrical heating element 14 to changing conditions. For example an increase in air stream humidity, a decrease in air stream temperature, a decrease in air stream volume reaching the surface of the windshield due to a redistribution of the air stream through a change in operating mode or a decrease in blower speed all reduce the effectiveness of the air circulation system 20 in defogging the windshield 12. The controller 40 effectively monitors for these changes and increases the duty cycle of the heating element 14 to compensate. Further, the controller 40 can adjust the duty cycle in the opposite direction where appropriate, such as when the operator manually changes the operating mode or blower speed so that the air circulation system 20 directs a greater air stream volume against the surface of the window. Two specific operating examples of the system 10 are presented below.

Example 1

1. Customer begins their drive in the following conditions
   A. Outside Ambient temperature=10° C. (50° F.).
   B. Relative Humidity inside the cabin is =20% (as measured by the sensor).
   C. Automatic climate controls set the air distribution mode to Feet (or Floor).
   D. The HVAC fan (or HVAC blower) is set to speed 5.
2. As a result, the automatic climate system will set the heated windscreen duty cycle to 50% (based on Table B).
3. Soon thereafter (milliseconds later given software speed), the controls increment the duty cycle by 25% (Based on Table D).
4. The climate controls will set the commanded heated windscreen operating duty cycle to 75% (50%+25%).

Example 2

1. Customer begins their drive in the following conditions
   A. Outside Ambient temperature=20° C. (68° F.).
   B. Relative Humidity inside the cabin is =50% (as measured by the sensor).
   C. Climate controls set the air distribution mode to Face/Feet (or Panel/Floor).
   D. The HVAC fan (or HVAC blower) is set to speed 3.
2. As a result, the automatic climate system will initially set the heated windscreen duty cycle to 0% (based on Table C).
3. Soon thereafter (milliseconds later given software speed), the controls increment the duty cycle by 50% (Based on Table D).
4. The climate controls will set the commanded heated windscreen operating duty cycle to 50% (0%+50%).

Example 3

1. Customer begins their drive in the following conditions:
   A. Outside Ambient temperature=20° C. (68° F.).
   B. Relative Humidity inside the cabin is =50% (as measured by the sensor).
   C. Climate controls set the air distribution mode to Face/Feet (or Panel/Floor).
   D. The HVAC fan (or HVAC blower) is set to speed 3.
2. As a result, the automatic climate system will initially set the heated windscreen duty cycle to 0% (based on Table C).
3. Soon thereafter (milliseconds later given software speed), the controls increment the duty cycle by 50% (Based on Table D).
4. The climate controls will set the commanded heated windscreen operating duty cycle to 50% (0%+50%).
5. The user then pushes the Heated Windscreen button.
6. The indicator on the button will turn ON. The controls will then set the Heated Windscreen duty cycle to 100% for 8 minutes (based on Table A).
7. After 8 minutes, the indicator on the button will turn OFF. (The user request will time out per Table A).
8. Assuming the conditions are now:
   A. Outside Ambient temperature=20° C. (68° F.).
   B. Relative Humidity inside the cabin is =100% (as measured by the sensor).
   C. Climate controls set the air distribution mode to Feet/Defrost (or Floor/Windscreen).
   D. The HVAC fan (or HVAC blower) is set to speed 7.
9. As a result, the automatic climate system will then set the heated windscreen duty cycle to 50% (based on Table C).
10. Soon thereafter (milliseconds later given software speed), the controls increment the duty cycle by 50% (Based on Table D).
11. The climate controls will set the commanded heated windscreen operating duty cycle to 100% (50%+50%).

The foregoing has been presented for purposes of illustration and description. It is not intended to be exhaustive or to limit the embodiments to the precise form disclosed. Obvious modifications and variations are possible in light of the above teachings. For example the Reference Tables presented in FIGS. 7-13 are illustrative of just one possible set of predetermined data used by the controller 40 to set the duty cycle for the electrical heating element 14. Other sets of data could be used. Similarly, the algorithm for the fogging probability value in FIG. 6 is illustrative of just one possible algorithm and other, different algorithms could be used. Further, while the description and drawing FIG. 1 reference dividing the heating element 14 into a driver side element 16 and a passenger side element 18, the heating element could be divided in another way, such as horizontally into a top, a middle and a bottom zone. All such modifications and variations are within the scope of the appended claims when interpreted in accordance with the breadth to which they are fairly, legally and equitably entitled.

What is claimed:

1. A windshield defogging system for a vehicle, comprising:
a windshield including an electrical heating element;
an air circulation system including a blower to provide a stream of air over a surface of said windshield; and
a controller configured to select a duty cycle for said electrical heating element from predetermined data based upon air circulation system operating parameters and environmental conditions, wherein said controller is also configured to calculate a fogging probability value and said duty cycle is selected by said controller based upon air circulation system operating parameters, said fogging probability value and ambient temperature.

2. The defogging system of claim 1, wherein said fogging probability value is determined by the controller via a system algorithm.

3. The defogging system of claim 2, wherein said air circulation system operating parameters are selected from a group consisting of operating mode, blower speed, air stream temperature, air stream humidity and combinations thereof.

4. The defogging system of claim 2, wherein said controller comprises a computing device including a main processor, a memory, a network interface and a communications bus.

5. The defogging system of claim 2, wherein said circulation system includes an air conditioning circuit, including an evaporator, a condenser and a compressor for cooling and dehumidifying the air stream, and a heater core for heating said air stream.

6. The defogging system of claim 5, further including at least one sensor selected from a group consisting of an outside ambient temperature sensor, a rain sensor, a passenger compartment humidity sensor, a passenger compartment temperature sensor, a windshield wiper activation sensor, seat sensors, air circulation system duct temperature sensor, an air circulation system duct humidity sensor, an air circulation system evaporator thermistor, a sun load sensor, a vehicle speed sensor and combinations thereof.

7. The defogging system of claim 6, further including a fogging detection camera.

8. The defogging system of claim 5, further including sensors for detecting outside ambient temperature sensor, passenger compartment humidity, outside temperature air circulation system discharge temperature, HVAC/air circulation system operating point (blower speed and mode) and passenger compartment temperature.

9. A motor vehicle incorporating said windshield defogging system of claim 1.

10. A motor vehicle incorporating said windshield defogging system of claim 2.

11. The motor vehicle of claim 10, further including a body control module comprising a computing device including a main processor, a memory, a network interface, a human interface, a display device and a communications bus.

12. The motor vehicle of claim 11, wherein said body control module further includes a speech processor for processing voice commands relating to said windshield defogging system.

13. The motor vehicle of claim 11, wherein said body control module is configured to reduce an operating speed of said blower to a predetermined value when a vehicle occupant is using hands-free telephone communication within said vehicle and said controller then adjusts said duty cycle based upon said reduction in blower speed.

14. The motor vehicle of claim 13, wherein (a) said body control module includes a GPS/geolocator component to determine a current location for said vehicle at any given time, (b) said body control module is configured to obtain current ambient weather condition data for said current location over a wireless network and (c) said controller is configured to use said current ambient weather condition data to calculate said fogging probability value, select said duty cycle or both calculate said fogging probability value and select said duty cycle.

15. A method of defogging a windshield of a vehicle equipped with (a) a windshield including an electrical heating element, (b) an air circulation system including a blower to provide a stream of air over a surface of the windshield and (c) a controller, said method comprising:
selecting, by said controller, a duty cycle for said electrical heating element from predetermined data based upon air circulation system operating parameters and ambient temperature; and
adjusting, by said controller, said duty cycle in response to a change in blower speed.

16. The method of claim 15, further including calculating, by said controller, a fogging probability value and selecting, by said controller, said duty cycle for said electrical heating element from predetermined data based upon air circulation system operating parameters, said fogging probability value and ambient temperature.

17. The method of claim 16, further including using in the calculation of said fogging probability value, at least one air circulation system operating parameter selected from a group consisting of operating mode, blower speed, air stream temperature and air stream humidity when selecting said duty cycle.

18. The method of claim 16, further including (a) determining, by said controller, a current location for said vehicle and current weather data for said current location and (b) using said current weather data to calculate said fogging probability value, select a duty cycle or both calculate said fogging probability value and select a duty cycle.

19. The method of claim 16, further including adjusting, by said controller, said duty cycle in response to a change in distribution of said air stream directed over said surface of said windshield.

* * * * *